United States Patent
Khan et al.

(10) Patent No.: US 12,333,838 B2
(45) Date of Patent: Jun. 17, 2025

(54) MACHINE LEARNING BASED INFORMATION EXTRACTION

(71) Applicant: SAP SE, Walldorf (DE)

(72) Inventors: Subhadeep Khan, Bangalore (IN); Vidhya R Shetty, Bangalore (IN)

(73) Assignee: SAP SE, Walldorf (DE)

( * ) Notice: Subject to any disclaimer, the term of this patent is extended or adjusted under 35 U.S.C. 154(b) by 517 days.

(21) Appl. No.: 17/889,640

(22) Filed: Aug. 17, 2022

(65) Prior Publication Data

US 2024/0062568 A1 Feb. 22, 2024

(51) Int. Cl.
*G06V 30/40* (2022.01)
*G06V 30/19* (2022.01)

(52) U.S. Cl.
CPC .................. *G06V 30/19153* (2022.01)

(58) Field of Classification Search
CPC ............. G06V 30/19153; G06V 30/40–43
See application file for complete search history.

(56) References Cited

U.S. PATENT DOCUMENTS

| | | | | |
|---|---|---|---|---|
| 2012/0330971 A1* | 12/2012 | Thomas | .................. | G06N 20/00 707/748 |
| 2014/0153830 A1* | 6/2014 | Amtrup | ................. | G06V 30/416 382/190 |
| 2017/0116494 A1* | 4/2017 | Isaev | ...................... | G06V 20/46 |
| 2018/0018338 A1* | 1/2018 | Guzman | .............. | G06Q 40/123 |
| 2020/0193525 A1* | 6/2020 | Vermer | .................. | G06Q 40/12 |
| 2021/0004912 A1* | 1/2021 | Stark | ..................... | G06V 30/224 |
| 2021/0012102 A1* | 1/2021 | Cristescu | ............... | G06F 40/284 |
| 2021/0034859 A1* | 2/2021 | Boutherin | ................ | G06F 16/51 |
| 2022/0172204 A1* | 6/2022 | Stark | ......................... | G06T 7/74 |
| 2022/0253959 A1* | 8/2022 | Wu | ......................... | H04L 9/3247 |
| 2023/0134218 A1* | 5/2023 | Semenov | .................. | G06N 3/08 382/159 |
| 2023/0186668 A1* | 6/2023 | Dong | ..................... | G06F 40/114 382/176 |
| 2023/0245485 A1* | 8/2023 | Rimchala | ............. | G06V 30/413 382/176 |
| 2023/0282016 A1* | 9/2023 | He | ........................... | G06N 7/01 382/159 |
| 2023/0386236 A1* | 11/2023 | Rimchala | ......... | G06V 30/19167 |
| 2024/0062568 A1* | 2/2024 | Khan | .................... | G06V 30/413 |
| 2024/0062571 A1* | 2/2024 | Anzenberg | ............. | G06V 30/41 |

\* cited by examiner

*Primary Examiner* — Sean T Motsinger
(74) *Attorney, Agent, or Firm* — Fountainhead Law Group, PC

(57) ABSTRACT

Computer-readable media, methods, and systems are disclosed for applying machine learning mechanisms to classify and validate documents based on expense rule sets and external data validation services. Document images associated with expenses are received in connection with a reimbursable event. For each received document image data associated with the received document image is transmitted to an optical character recognition image processor that can recognize contents and associated coordinates. OCR data is received and transmitted to a text tokenizer. Tokenized text is received corresponding to expense details, and the tokenized text and coordinates are sent to a text feature generator. Text feature vectors are received and transmitted to a document classifier and a document classification received. Document fields are extracted and based thereon a document is validates and a corresponding reimbursement instruction generated.

20 Claims, 5 Drawing Sheets

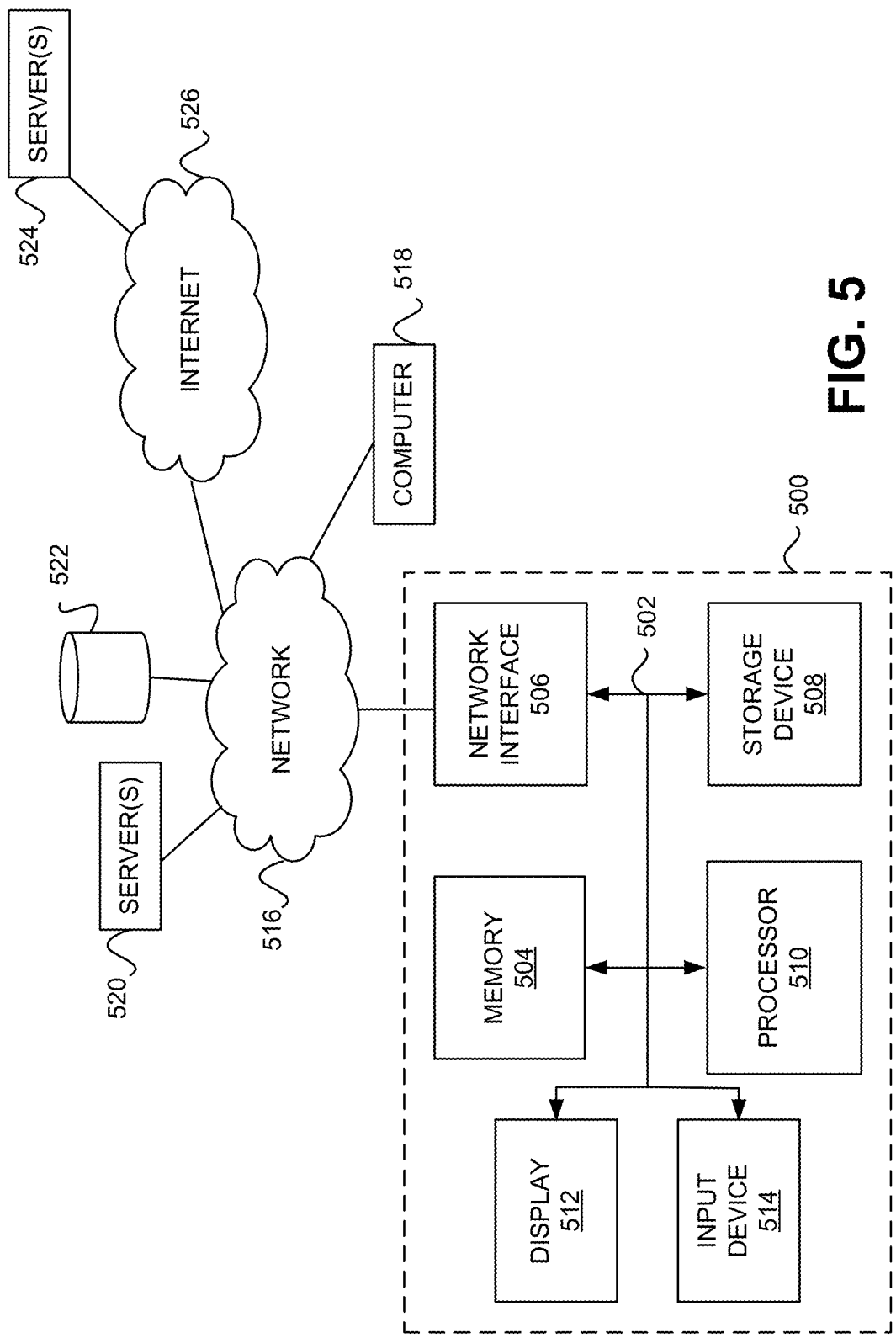

MACHINE LEARNING BASED INFORMATION EXTRACTION

TECHNICAL FIELD

Embodiments generally relate to machine learning based information extraction, and more particularly to applying machine learning techniques to classify and validate documents based on sets of rules and data validation services.

Electronic data management software such as expense management software implemented in the context of SaaS (Software as a Service) can be used to facilitate management and claiming of expenses associated with certain activities that may be properly characterized. By using software tools to facilitate expense management, an organization may characterize, and classify resource allocation according to multiple sources, make intelligent resource allocation decisions based on accurate data, and simplify data processing. To claim expenses, typically a user within an organization may be required to carry out certain technical steps. First, a user may be requested to create and submit a detailed expense report that enumerates, describes, and justifies particular resource allocations. Next a user may submit such a report into a technical approval flow, in which the detailed report and underlying documentation may be subjected to technical analysis and a rules-based workflow. In order for resources to be reimbursed to a user, such a report may only be reimbursed, where approval is provided based on the rules-based workflow. Existing approaches for expense report creation for an employee are typically complex and burdensome for users. Once the expense report is generated there typically is a requirement to upload necessary receipts/invoices to claim the expenses. While doing so it is possible to upload invalid receipts/multiple receipts, receipt with a different date apart from what is mentioned in the report while submitting. All of these would involve manual effort in processing the claims which are created, and these would further delay the reimbursement. Accordingly, what is needed is a machine learning mechanism to classify and validate documents based on sets of rules and data validation services, thereby addressing the above-mentioned problems.

SUMMARY

Disclosed embodiments address the above-mentioned problems by providing one or more non-transitory computer-readable media storing computer-executable instructions that, when executed by a processor, perform a method for applying machine learning techniques to classify and validate documents based on sets of rules and data validation services, the method comprising: receiving, by a document classification service, one or more document images associated with expenses incurred in connection with a reimbursable event, for each received document image in the one or more document images: transmitting image data associated with the received document image to an optical character recognition image processor, the optical character recognition image processor configured to recognize textual contents and coordinates associated with graphical and textual information contained within the received document image, receiving optical character recognition data from the optical character recognition image processor, wherein the optical character recognition data comprises the textual contents and coordinates associated with graphical and textual information, transmitting the optical character recognition data to a text tokenizer, receiving tokenized text from the text tokenizer, wherein the tokenized text comprises text entities corresponding to expense details associated with the expenses occurred in connection with a reimbursable event, transmitting the tokenized text and the coordinates associated with graphical and textual information to a text feature generator, receiving one or more text feature vectors from the text feature generator, transmitting the one or more text feature vectors to a document classifier, receiving a document classification from the document classifier, wherein the document classifier employs a document classification machine learning model that is trained on previously validated documents, extracting extracted document fields from the one or more text feature vectors based on a document extraction machine learning model and the one or more expense rule sets, based on the extracted document fields and the document classification, validating a document based on the received document image, the received document classification, and the one or more data validation services to produce a validation result, and based on the validation result, automatically generating a reimbursement instruction corresponding to the received document classification and the extracted document fields.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present teachings will be apparent from the following detailed description of the embodiments and the accompanying drawing figures.

BRIEF DESCRIPTION OF THE DRAWING FIGURES

Embodiments are described in detail below with reference to the attached drawing figures, wherein:

FIG. 5 is a diagram illustrating a sample computing device architecture for implementing various aspects described herein.

Figure 1:
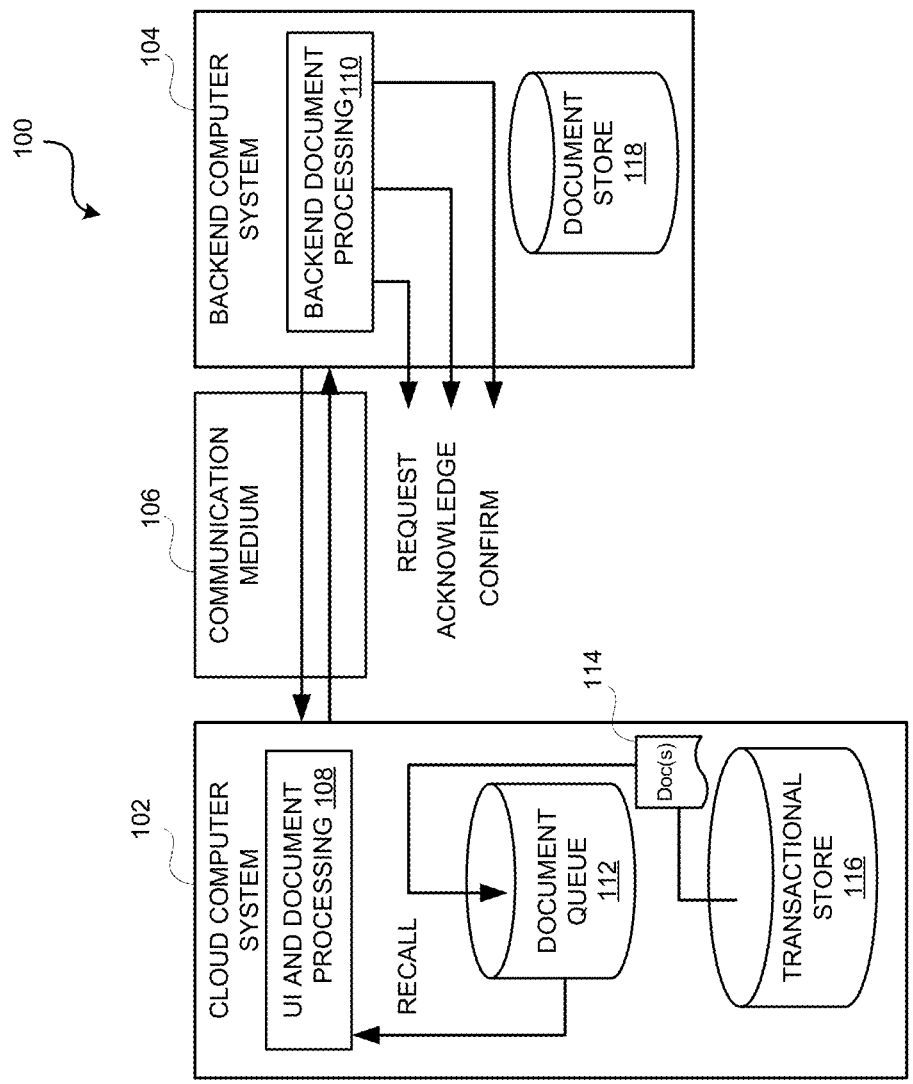
FIG. 1 illustrates a cloud computer system and backend system according to an embodiment.

The drawing figures do not limit the present teachings to the specific embodiments disclosed and described herein. The drawings are not necessarily to scale, emphasis instead being placed upon clearly illustrating the principles of the disclosure.

DETAILED DESCRIPTION

Mechanisms consistent with the present teachings reduce time spent on creating, processing, validating, and reimbursing expense claims, mechanisms consistent with the present teachings involve automatically extracting relevant information from the provided documentation by applying machine learning based techniques. In some embodiments, an additional section may be added in an expense report creation user interface to facilitate uploading available claim documentation. Mechanisms consistent with the present teachings may then employ artificial intelligence techniques to prefill certain required fields in an associated expense claim user interface so that the user is provided the ability to proceed with a claim submission directly without additional user interaction.

Automated expense claim submission tools consistent with the present teachings involve obtaining several categories of details as well as underlying technical documentation. A first detail category relates to an expense type, which may relate to an internal classification of certain resource allocations or such an expense type may be useful for classifying an expense under certain technical or accounting classifications, including those classifications relevant to compliance with certain taxation regimes. Next, a category of transaction date may be relevant to associating certain expense documentation with certain date ranges associated with an event to which the report corresponds. Matching transaction dates to an expense report date range may be relevant to certain guidelines and requirements either internal to or external to an organization with which the user is associated. Such temporal characteristics of documentation may be useful in connection with machine learning techniques developing a model regarding the event on which reporting is occurring. Next, a physical location category corresponding to a city or region in which the documented expense was incurred may be relevant to confirming that an expense was incurred in a physical location that is consistent with the event being reported on. Next, a currency associated with the expense may be relevant both as it relates to a physical location of the associated event and compliance with internal and/or external guidelines associated with incurring certain valid expenses. Finally, an amount of the expense may be relevant, and such amount may be gross or net, and certain components of the amount may or may not be appropriate under certain internal and/or external guidelines.

Such information may or may not be explicitly present in a particular document and may or may not be directly or indirectly ascertainable from contents of the document. For example, expense type is a data field that generally may not be explicitly present in a particular document. Rather, the expense type would need to be manually provided or automatically inferred or learned from documents. This may be derived from document layout or other information, which may be ascertained by applying a machine learning model that was trained on similar documents. For example, this mechanism may be formulated as a document classification model for which the several classes make up the most common expense types. Such classes may include: (i) hotel; (ii) laundry; (iii) air fare; (iv) car rental; (v) ferry 6; (vi) fuel; (vii) parking; (vii) visa fees; (ix) currency exchange fees; (x) agency booking fees; and (xi) telecommunications expenses, which itself may be broken down into subcategories such as Internet WiFi and mobile telephone expenses, for example. In terms of document classification, a particular document may be initially processed in connection with an optical character recognition (OCR) engine to obtain certain alphanumeric content and associated coordinates within a rasterized representation of a scanned document. In some embodiments, this may be provided in the form of an OCR output format that contains text and the respective coordinates of where text and certain other images occurs. Such content may be used by machine learning classification models which then predict a class label of the document along with an associated confidence score.

In some embodiments, a machine learning model is provided in the context of a computer hardware and software architecture environment. In some embodiments, an OCR output contains both the text content and corresponding coordinates information. Text content is first tokenized by a tokenizer. The tokenized content is converted to a feature vector by technical word embeddings. Since a two-dimensional structure of the document also important for identifying certain class information, positional embedding may be used as well to construct a final feature vector. A classification model includes a fully convolutional neural network followed by a technical activation function.

Thereafter, document extraction may be carried out as follows. Information that should be present in the document may include other fields except the expense type. Several other fields may be present in the documents provided to the system, and a machine learning based extraction model to extract additional fields. In some embodiments, a document information extraction (DOX), artificial intelligence service may be used to extract certain additional fields from a document. Such services employ a fully convolutional encoder decoder network that predicts a segmentation mask and bounding boxes.

A model training pipeline may be employed as follows. For document classification and document extraction models, a training pipeline may be divided into several stages. Data collection and annotation may be carried out in connection with historical data to train a model. In some embodiments, this may involve collecting various diverse example documents various expense types. As the layout structure varies from vendor to vendor, for example, it may be useful for there to be representation of the different vendor/layout pairs for each of the expense types. Additionally, and in the alternative data augmentation techniques may be employed to create synthetic images to cover a broad spectrum of various layouts for training. Data annotation is useful for supervised learning and hence available fields may be clearly annotated to facilitate model training. As part of data preprocessing various tasks may be performed. Data cleansing may be used to remove outliers from a training set. In some embodiments to carry out training an overall data set may be separated out into train, test, and validation subsets. With respect to training, multiple experiments may be performed with different hyperparameter configurations with a best model being chosen based on an accuracy on the test data. As for model storage, a final model output of the training process may be stored in a cloud-based object store for the prediction of the fields. With respect to model inference, in an expense claim submission workflow, when a document is provided to an expense tool consistent with the present teachings, the model inference is used for both model classification and information extraction. In some embodiments, both models may be stored in a cloud-based object store once model training is completed. During inference execution, the models may be loaded in memory and used for inference, i.e., document classification, etc.

An API may be provided having definition as follows. POST /document/jobs/—submit a document for creating asynchronous inference job. This returns the job id. The model details (classification or extraction are provided in the request payload. GET /document/jobs/{jobId}—use the jobId to get the status of the inference job.

The subject matter of the present disclosure is described in detail below to meet statutory requirements; however, the description itself is not intended to limit the scope of claims.

Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the present claims. Terms should not be interpreted as implying any particular ordering of various steps described unless the order of individual steps is explicitly described.

The following detailed description of embodiments references the accompanying drawings that illustrate specific embodiments in which the present teachings can be practiced. The described embodiments are intended to illustrate aspects of the present teachings in sufficient detail to enable those skilled in the art to practice the present teachings. Other embodiments can be utilized, and changes can be made without departing from the claims. The following detailed description is, therefore, not to be taken in a limiting sense. The scope of embodiments is defined only by the appended claims, along with the full scope of equivalents to which such claims are entitled.

In this description, references to "one embodiment," "an embodiment," "or "embodiments" mean that the feature or features being referred to are included in at least one embodiment of the technology. Separate reference to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Operational Environment for Embodiments

FIG. 1 illustrates an overall platform 100 including a cloud computer system 102 and backend computer system 104 according to one or more embodiments. Features and advantages of the present disclosure include methods and software techniques, executable on a computer system, for integrating a cloud computer system's software with a backend computer system's software. Referring to FIG. 1, cloud computer system 102 may include user interface software (UI) and other functional software 108, which may include document/data processing. Cloud computer system software typically provides direct user access over the Internet as well as backend cloud processing for many users, for example. However, many organizations may also have backend computer systems running legacy software. For a variety of reasons, some users and/or organizations prefer to have some computers and software executing on their own proprietary hardware and/or software. Such computer systems are referred herein as "backend computer systems" 104 and may include servers owned by a user or organization, housed and operated on the user or organization's premises (sometimes referred to as "on prem"). As illustrated in FIG. 1, backend computer system 104 may execute backend document processing software 108 and one or more databases 118, for example. The backend computer system 104 and backend software 108 may be coupled to the cloud computer system and cloud software 108 over a communication medium 106, which may include the Internet and/or a variety of other networks, for example. Such cloud-backend implementations are sometimes referred to as "hybrid cloud systems (or herein just, "hybrid"), for example.

As cloud computing has grown in popularity in recently years, it has been important for the expanding functionality of cloud software to integrate with on-prem backend software, such as legacy enterprise resource planning (ERP) software, for example. In one embodiment, integration may include a feedback loop between the cloud computer system 102 and backend computer system 104 to facilitate the near real time exchange of transactional data between cloud software and backend software for purposes of integration. The result of any backend processing of cloud data (success or error) may be immediately be returned to the cloud system. Thus, error messages on the backend may be quickly and simply reported to the cloud so that the cloud software can react seamlessly to the needs of the backend software. Such processing may facilitate the validation of certain documents as further explained below.

In one embodiment, hybrid cloud-backend integration may include a request message (e.g., Request Data in FIG. 1), an acknowledgement message (e.g., Acknowledge in FIG. 1), and a confirmation message (e.g., Confirm Processing in FIG. 1) between the backend computer system and the cloud computer system. The request may retrieve data associated with one or more documents from the first computer system to the second computer system. The acknowledgement may indicate that the data associated with the document(s) was received on the backend computer system, for example. The confirmation may indicate a status of one or more processing steps being performed on the document on the backend. In one embodiment, data associated with the document cannot be recalled for certain processing once the acknowledgement message has been received until after the status confirmation message indicates that the one or more processing steps on the backend have been successfully or unsuccessfully completed, for example. One advantage of such an approach is that if a process on the cloud computer system is related to a process on the backend computer system, then once a document is ready for backend processing (e.g., the cloud side process is deemed to have been completed), the document can be blocked from recall or otherwise locked down after the document is received by the backend (e.g., and not before) until the backend computer system indicates it has completed its' processing steps, for example.

As mentioned above, another problem with hybrid cloud systems is that the performance of transactional databases on the cloud computer system may be adversely impacted when the backend computer system needs to access or change data, for example. In one embodiment, cloud computer system 102 may include one or more transactional databases 116 to store data associated with cloud application software 108 as well as a document queue 112 to store data associated with documents 114. Advantageously, backend computer system 104 may access data from document queue 112 rather than directly from transactional database 116 so that the performance of database 116 is not degraded. For example, in one embodiment, data associated with a document may be stored in a plurality of tables in a transactional database. Accordingly, cloud computer system software may access data associated with one or more documents (e.g., documents ready for external processing) and store the data associated with each document together in a queue. Accordingly, rather than having data for different documents stored disparately across numerous tables, some embodiments may advantageously gather some or all of the data for a particular document and store it together in document queue 112. In one embodiment, data associated with a document may be stored together in a JSON object, for example. JSON (or JavaScript Object Notation) is a lightweight data-interchange format that is easy for humans to read and write and easy for machines to parse and generate. JSON is based on a subset of the JavaScript Programming Language.

Features and advantages of the present disclosure include limiting recall of documents in the queue so the status of the document in the backend system processing is known before the document is recalled from the queue for additional processing. For example, as soon as a document (e.g., and expense report, a cash advance, or an invoice) is ready for processing by the backend, it will be sent to queue 112 where it waits to be processed by the backend. A document on the cloud side may be recalled for further processing as long the cloud document is not retrieved from the queue by the backend system. Once the document is acknowledged by the backend system as having been retrieved, the document cannot be recalled, and the cloud system must wait for the confirmation message for this document to be sent by the backend system. The confirmation can be a success message which informs the cloud system that the document has been successfully processed (e.g., posted into a backend financial system). In one embodiment, the document may be recalled if the confirmation indicates the one or more processing steps on the backend computer system have been unsuccessfully completed. For example, if the confirmation indicates an error has occurred on the backend (or the backend processing was otherwise unsuccessful), it is then possible to recall the document in the cloud system after error confirmation to correct the error in the document and resend it to the queue for backend processing. Using the techniques described herein, there is a clear segregation of duties between the cloud and backend systems. The backend computer system is responsible for specific processing functions (e.g., posting into a financial system), but major interaction with the cloud system may be triggered by the cloud computer system storing documents in the queue. The request, acknowledge, and confirmation signals inform the cloud computing system of the status of the backend processing. Other than blocking recall from the queue and further processing of the document for a time between the acknowledgement and confirmation, the cloud and backend systems may advantageously operate independently and asynchronously.

Figure 2A:
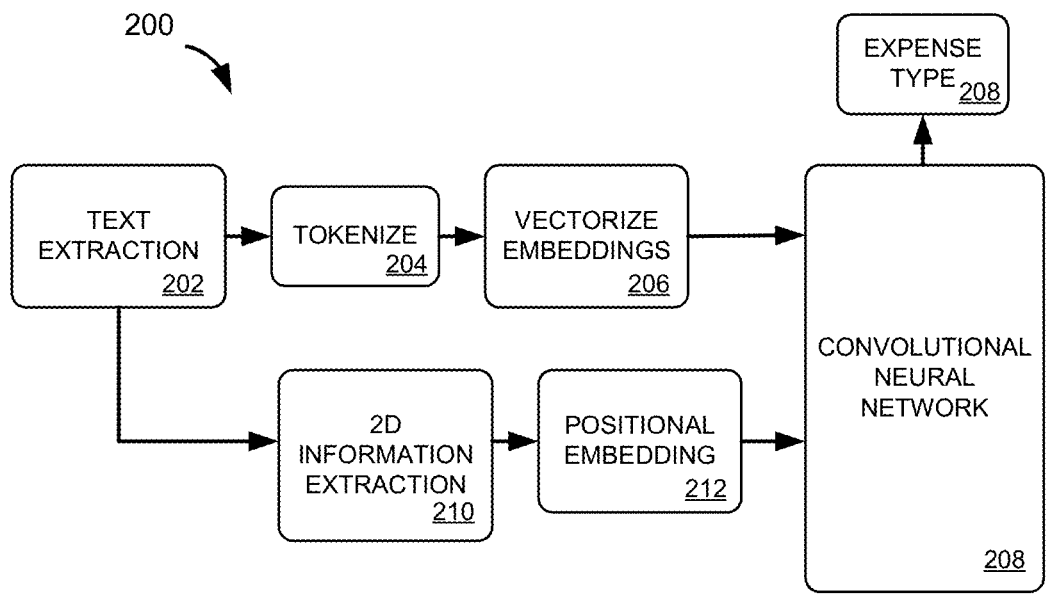
FIGS. 2A-2B illustrate flow diagrams to support methods applying machine learning techniques to classify and validate documents based on sets of rules and data validation services.

FIG. 2A illustrates a flow diagram 200 to support methods applying machine learning techniques to classify and validate documents based on sets of rules and data validation services. First documents 202 (labeled Doc(s) in FIG. 2A) are provided to an optical character recognition (OCR) service 204. Such an OCR service may be provided in connection with cloud computer system 102 in connection with UI and system processing 108, for example. Alternatively, OCR service 204 may be provided by an internal or external API integration such as a web services integration by which documents 202 or data files associated with documents 202, such as digital document image content, may be provided to OCR service 204.

Once OCR service 204 has received input from which it can recognize characters and other digital content contained within documents 202, corresponding output from OCR service 204 may be provided to one or more processors that implement machine learning mechanisms by applying machine learning based classification model 206. Model 206 may evaluate information that may or may not be explicitly present in a particular document and may or may not be directly ascertainable from recognized document contents. For example, an explicit document classification may not be explicitly present in a particular document. Rather, a classification such as "expense type" may be automatically inferred or learned from document contents. This may be derived from document layout or other information, which may be ascertained by applying model 206, which may have been trained on similar documents. Upon applying model 206, expense type 208 may be provided as an output consistent with a successfully derived document classification.

Figure 2B:
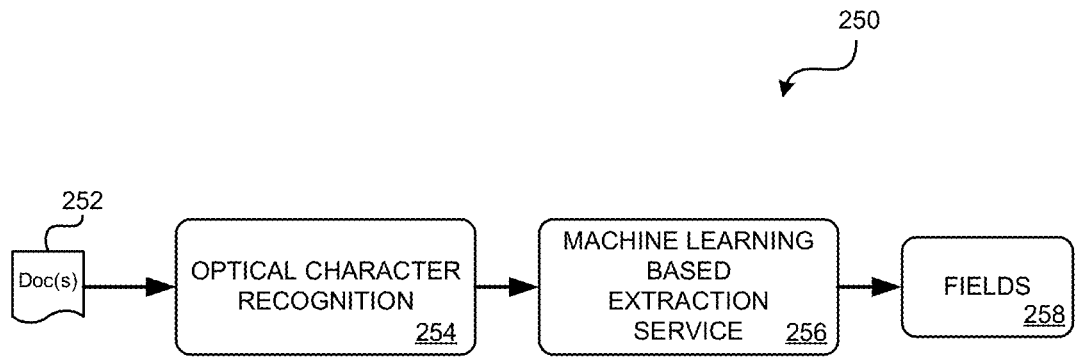

FIG. 2B illustrates an alternative flow diagram 250 to support methods applying machine learning techniques to classify and validate documents based on sets of rules and data validation services. Text extraction 252 may be performed on document contents such as that derived from documents 202 in FIG. 2A above. Such extracted text may be provided in parallel by tokenizing the extracted text at step 254 as well as being subjected to two-dimensional information extraction at step 260.

Following a first parallel path starting at step 254, processing proceeds on to step 256, where word embeddings are vectorized, for example in connection with a processor such as the Global Vectors for Word Representation (GloVe) processor. Such a vector processor may generate embeddings that provide inputs to a convolutional neural network at step 258. Combined with other inputs, the convolutional neural network that executes at step 258 may provide a document classification such as expense type 208. Following a second parallel path starting at step 260, a two-dimensional information extraction is executed to provide input to positional embeddings at step 262, which itself provides such additional input to the convolutional neural network at step 258.

In some embodiments, model 206 is provided in the context of a computer hardware and software architecture environment. In some embodiments, an OCR output contains both the text content and corresponding coordinates information. Text content may be tokenized by the tokenizer at step 254. Such tokenized content may be then converted to a feature vector by technical word embeddings. Additionally, the two-dimensional structure of the document also may be beneficial for identifying certain class information. Positional embedding may also be used to construct a feature vector associated with the document.

Figure 3:
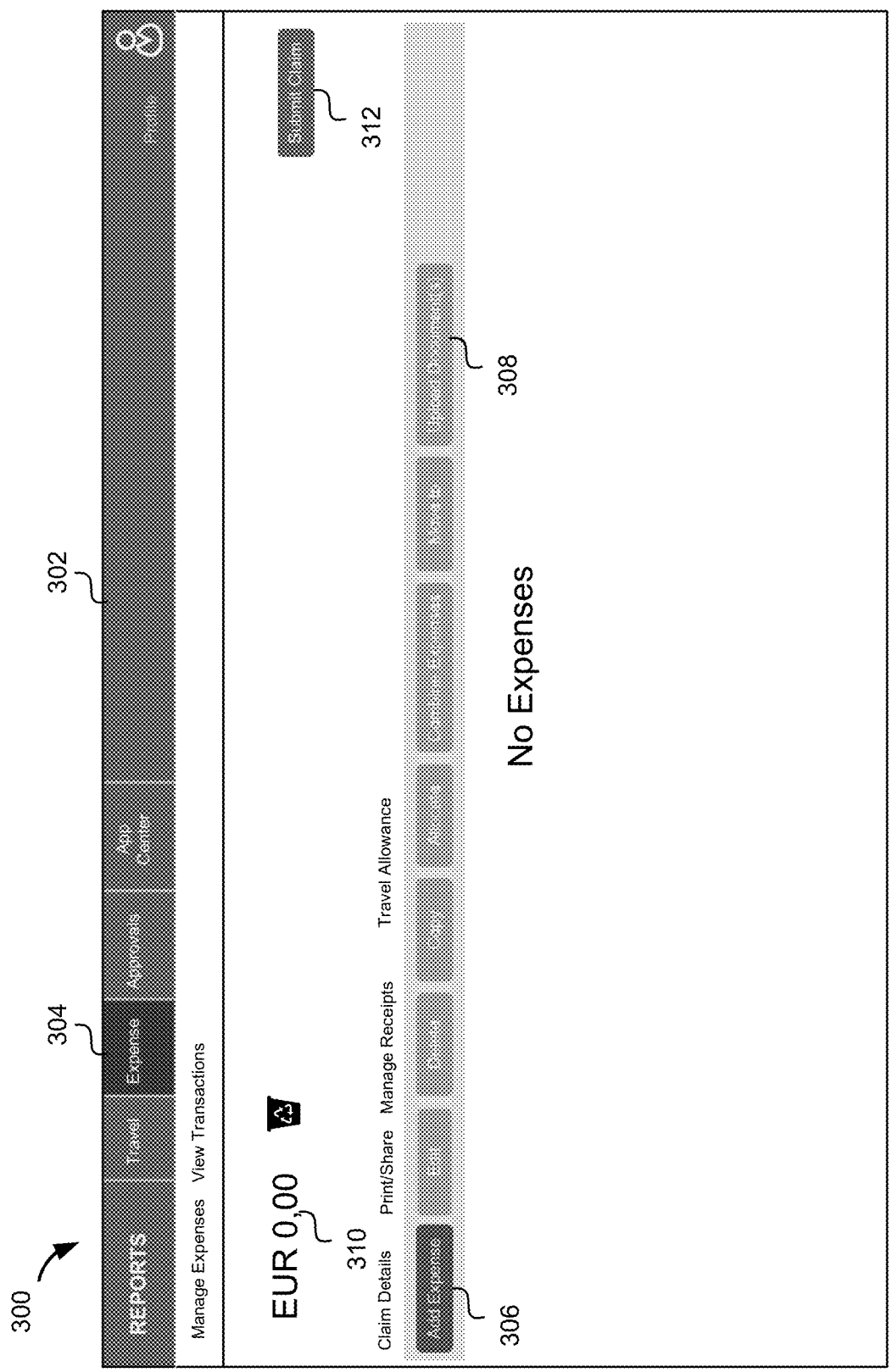
FIG. 3 illustrates an example user interface to support methods for applying machine learning techniques to classify and validate documents based on sets of rules and data validation services.

FIG. 3 illustrates an example user interface 300 to support methods for applying machine learning techniques to classify and validate documents based on sets of rules and data validation services. User interface 300 may include a menu bar 302 that contains a high-level set of possible menu tabs that may facilitate a user experience for processing certain technical reports, such as, for example, expense reports. Such menu selections may include travel; expenses; approvals; and an app center to provide further application functionality. As shown in FIG. 3, menu tab 304, corresponding to Expenses, has been selected. By selecting menu tab 304, a user of user interface 300, may select "Add Expense" button 306. In some embodiments, by selecting button 306, the user may be presented with a subsequent user interface that may allow the user to manually input certain expense report line items and optionally upload one or more documents associated with the line item. In some other embodiments, upon selecting button 306, a single document may be uploaded or otherwise provided to a backend system associated with user interface 300. Such document(s) may then be processed consistent with the present teachings. The user may continue to input expenses until an associated expense report is complete. Thereupon, the user may choose to select "Submit Claim" button 312, and the claim may be validated and optionally approved as further set forth herein.

Alternatively, a user may select "Upload Document(s)" button 308, which may activate a fully automated system to analyze the uploaded documents and by applying machine learning techniques, classify and validate the documents based on sets of rules and data validation services.

Figure 4:
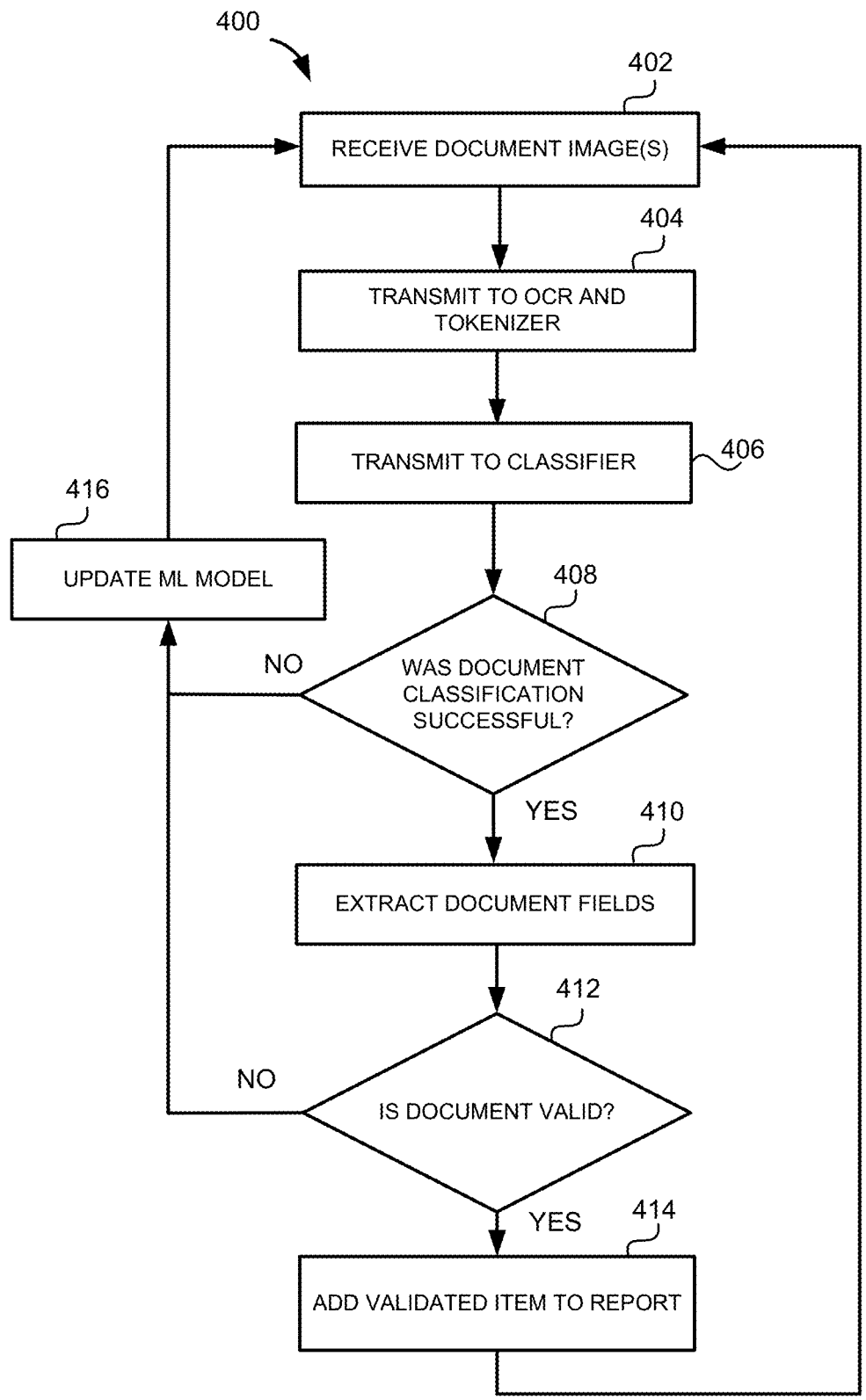
FIG. 4 is a flow diagram illustrating methods for applying machine learning techniques to classify and validate documents based on sets of rules and data validation services consistent with various embodiments.

FIG. 4 is a flow diagram 400 illustrating methods for applying machine learning techniques to classify and validate documents based on sets of rules and data validation services consistent with various embodiments. First, at step 402, document images associated with expenses incurred in connection with a reimbursable event may be received by a document classification service. For each such received document image, various steps may be carried out.

At step 404, image data associated with the received document image may be transmitted to an optical character recognition image processor that may be configured to recognize textual contents and coordinates associated with graphical and textual information contained within the received document image. Optical character recognition data may then be received from the optical character recognition image processor. Such optical character recognition data may include textual contents and coordinates associated with graphical and textual information associated with a particular set of image data. In some embodiments, the optical character recognition data may be transmitted to a text tokenizer. Additionally at step 404, associated tokenized text may be received from the text tokenizer. Such tokenized text may include text entities corresponding to expense details associated with certain expenses incurred in connection with a reimbursable event. In some embodiments, the tokenized text and the coordinates associated with graphical and textual information may be transmitted to a text feature generator and certain text feature vectors received from the text feature generator.

Next at step 406, associated text feature vectors may be transmitted to a document classifier. Thereafter, a document classification may be received from the document classifier, which may employ a document classification machine learning model that is trained on previously validated documents. If at test 408, it is determined that the associated document classification was successful, execution proceeds to step 410. On the other hand, if it is determined that the associated document classification was not successful, execution proceeds to step 416, at which point an associated machine learning model may be updated. In some embodiments, such failed classifications may require intervention to derive a reason that the classification did not succeed. In some other embodiments, where a confidence ratio is too conservative, thereby causing a classification not to succeed, the underlying machine learning model may be updated to result in a higher confidence ratio if the failure of the classification is determined to be a false negative. In some other embodiments, a document may be associated with a document classification or expense type that the machine learning model has not experienced before or for which insufficient prior training input was provided. In some embodiments, additional similar training documents may be obtained and the model retrained. In some such embodiments, training occurs at step 416 in real time as the documents are processed either with or without administrator intervention.

Returning to step 410, upon successful document classification, extracted document fields may be extracted from the one or more text feature vectors based on a document extraction machine learning model and the one or more expense rule sets. In some embodiments, the extracted document fields include date fields associated with the reimbursable event and wherein automatically generating a reimbursement instruction corresponding to the received document classification and the extracted document fields further comprises automatically generating a reimbursement instruction based on the one or more date fields. In some other embodiments, the extracted document fields comprise one or more transaction location fields associated with a geographical location and wherein automatically generating a reimbursement instruction corresponding to the received document classification and the extracted document fields further comprises automatically generating a reimbursement instruction based on the one or more transaction location fields. In some embodiments, inferred document location information ma be correlated with one or more event locations based on user-provided or derived event location information.

In some embodiments, based on the extracted document fields and the document classification, a document may be validated based on the received document image, the received document classification, and the one or more data validation services to produce a validation result. At test 412, it is determined whether the particular document is valid. In some embodiments, such a validation result may be based on various factors. One such factor involves determining that temporal and/or locational aspects of extracted data fields are consistent either with a date range and or location that was either manually provided or automatically derived from the provided set of documents. If it is determined at test 412, that the document is invalid, execution proceeds to step 416. Finally, if it is determined at test 412, that the document is valid, at step 414, the validated item may be added to an underlying report.

FIG. 5 is a diagram illustrating a sample computing device architecture for implementing various aspects described herein. Computer 500 can be a desktop computer, a laptop computer, a server computer, a mobile device such as a smartphone or tablet, or any other form factor of general- or special-purpose computing device containing at least one processor for executing code to perform certain actions. Depicted with computer 500 are several components, for illustrative purposes. Certain components may be arranged differently or be absent. Additional components may also be present. Included in computer 500 is system bus 502, via which other components of computer 500 can communicate with each other. In certain embodiments, there may be multiple busses or components may communicate with each other directly. Connected to system bus 502 is processor 510. Also attached to system bus 502 is memory 504. Also attached to system bus 502 is display 512. In some embodiments, a graphics card providing an input to display 512 may not be a physically separate card, but rather may be integrated into a motherboard or processor 510. The graphics card may have a separate graphics-processing unit (GPU), which can be used for graphics processing or for general purpose computing (GPGPU). The graphics card may contain GPU memory. In some embodiments no display is present, while in others it is integrated into computer 500. Similarly, peripherals such as input device 514 is connected to system bus 502. Like display 512, these peripherals may be integrated into computer 500 or absent. Also connected to system bus 502 is storage device 508, which may be any form of computer-readable media, such as non-transitory computer readable media, and may be internally installed in computer 500 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface 506 is also attached to system bus 502 and allows computer 500 to communicate over a network such as network 516. Network interface 506 can be any form of network interface known in the art, such as Ethernet, ATM, fiber, Bluetooth, or Wi-Fi (i.e., the Institute of Electrical and Electronics Engineers (IEEE) 802.11 family of standards). Network interface 506 connects computer 500 to network 516, which may also include one or more other computers, such as computer 518, server(s) 520 and network storage, such as cloud network storage 522. Network 516 is in turn connected to public Internet 526, which connects many networks globally. In some embodiments, computer 500 can itself be directly connected to public Internet 526 which may be connected to server(s) 524.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random-access memory associated with one or more physical processor cores.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims. Although the invention has been described with reference to the embodiments illustrated in the attached drawing figures, it is noted that equivalents may be employed, and substitutions made herein without departing from the scope of the invention as recited in the claims. The subject matter of the present disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the present claims. Terms should not be interpreted as implying any particular ordering of various steps described unless the order of individual steps is explicitly described.

Having thus described various embodiments of the invention, what is claimed as new and desired to be protected by Letters Patent includes the following:

1. One or more non-transitory computer-readable media storing computer-executable instructions that, when executed by a processor, perform a method for applying machine learning techniques to classify and validate documents based on one or more expense rule sets and one or more external data validation services, the method comprising:

receiving, by a document classification service, one or more document images associated with expenses incurred in connection with a reimbursable event;

for each received document image in the one or more document images:

transmitting image data associated with the received document image to an optical character recognition image processor, the optical character recognition image processor configured to recognize textual contents and coordinates associated with graphical and textual information contained within the received document image;

receiving optical character recognition data from the optical character recognition image processor, wherein the optical character recognition data comprises the textual contents and coordinates associated with graphical and textual information;

transmitting the optical character recognition data to a text tokenizer;

receiving tokenized text from the text tokenizer, wherein the tokenized text comprises text entities corresponding to expense details associated with the expenses incurred in connection with a reimbursable event;

transmitting the tokenized text and the coordinates associated with graphical and textual information to a text feature generator;

receiving one or more text feature vectors from the text feature generator;

transmitting the one or more text feature vectors to a document classifier;

receiving a document classification from the document classifier, wherein the document classifier employs a document classification machine learning model that is trained on previously validated documents;

extracting extracted document fields from the one or more text feature vectors based on a document extraction machine learning model and the one or more expense rule sets;

based on the extracted document fields and the document classification, validating a document based on the received document image, the received document classification, and the one or more data validation services to produce a validation result; and based on the validation result, automatically generating a reimbursement instruction corresponding to the received document classification and the extracted document fields.

2. The non-transitory computer-readable media of claim 1, wherein the extracted document fields comprise one or more date fields associated with the reimbursable event and wherein automatically generating a reimbursement instruction corresponding to the received document classification and the extracted document fields further comprises automatically generating a reimbursement instruction based on the one or more date fields.

3. The non-transitory computer-readable media of claim 1, wherein the extracted document fields comprise one or more transaction location fields associated with a geographical location and wherein automatically generating a reimbursement instruction corresponding to the received document classification and the extracted document fields further comprises automatically generating a reimbursement instruction based on the one or more transaction location fields.

4. The non-transitory computer-readable media of claim 1, wherein the method further comprises:

loading a loaded document classification machine learning model, wherein the loaded document classification machine learning model is trained based on previously approved documents.

5. The non-transitory computer-readable media of claim 4, wherein the method further comprises:

retraining the loaded document classification machine learning model based on the reimbursement instruction.

6. The non-transitory computer-readable media of claim 1, wherein the method further comprises:

receiving stored location information associated with the one or more document images and correlating the location information with event location information associated with the reimbursable event.

7. The non-transitory computer-readable media of claim 1, wherein the document classifier employs a document classification machine learning model that is trained on previously invalidated documents.

8. A method for applying machine learning techniques to classify and validate documents based on one or more expense rule sets and one or more external data validation services, the method comprising:

receiving, by a document classification service, one or more document images associated with expenses incurred in connection with a reimbursable event;

for each received document image in the one or more document images:

transmitting image data associated with the received document image to an optical character recognition image processor, the optical character recognition image processor configured to recognize textual contents and coordinates associated with graphical and textual information contained within the received document image;

receiving optical character recognition data from the optical character recognition image processor, wherein the optical character recognition data comprises the textual contents and coordinates associated with graphical and textual information;

transmitting the optical character recognition data to a text tokenizer;

receiving tokenized text from the text tokenizer, wherein the tokenized text comprises text entities corresponding to expense details associated with the expenses incurred in connection with a reimbursable event;

transmitting the tokenized text and the coordinates associated with graphical and textual information to a text feature generator;

receiving one or more text feature vectors from the text feature generator;

transmitting the one or more text feature vectors to a document classifier;

receiving a document classification from the document classifier, wherein the document classifier employs a document classification machine learning model that is trained on previously validated documents;

extracting extracted document fields from the one or more text feature vectors based on a document extraction machine learning model and the one or more expense rule sets;

based on the extracted document fields and the document classification, validating a document based on the received document image, the received document classification, and the one or more data validation services to produce a validation result; and based on the validation result, automatically generating a reimbursement instruction corresponding to the received document classification and the extracted document fields.

9. The method of claim 8, wherein the extracted document fields comprise one or more date fields associated with the reimbursable event and wherein automatically generating a reimbursement instruction corresponding to the received document classification and the extracted document fields further comprises automatically generating a reimbursement instruction based on the one or more date fields.

10. The method of claim 8, wherein the extracted document fields comprise one or more transaction location fields associated with a geographical location and wherein automatically generating a reimbursement instruction corresponding to the received document classification and the extracted document fields further comprises automatically generating a reimbursement instruction based on the one or more transaction location fields.

11. The method of claim 8, further comprising:
loading a loaded document classification machine learning model, wherein the loaded document classification machine learning model is trained based on previously approved documents.

12. The method of claim 11, further comprising:
retraining the loaded document classification machine learning model based on the reimbursement instruction.

13. The method of claim 8, further comprising:
receiving stored location information associated with the one or more document images and correlating the location information with event location information associated with the reimbursable event.

14. The method of claim 8, wherein the document classifier employs a document classification machine learning model that is trained on previously invalidated documents.

15. A system for applying machine learning techniques to classify and validate documents based on one or more expense rule sets and one or more external data validation services, the system comprising:
at least one processor;
and at least one non-transitory memory storing computer executable instructions that when executed by the at least one processor cause the system to carry out actions comprising:
receiving, by a document classification service, one or more document images associated with expenses incurred in connection with a reimbursable event;
for each received document image in the one or more document images:
transmitting image data associated with the received document image to an optical character recognition image processor, the optical character recognition image processor configured to recognize textual contents and coordinates associated with graphical and textual information contained within the received document image;
receiving optical character recognition data from the optical character recognition image processor, wherein the optical character recognition data comprises the textual contents and coordinates associated with graphical and textual information;
transmitting the optical character recognition data to a text tokenizer;
receiving tokenized text from the text tokenizer, wherein the tokenized text comprises text entities corresponding to expense details associated with the expenses incurred in connection with a reimbursable event;
transmitting the tokenized text and the coordinates associated with graphical and textual information to a text feature generator;
receiving one or more text feature vectors from the text feature generator;
transmitting the one or more text feature vectors to a document classifier;
receiving a document classification from the document classifier, wherein the document classifier employs a document classification machine learning model that is trained on previously validated documents;
extracting extracted document fields from the one or more text feature vectors based on a document extraction machine learning model and the one or more expense rule sets;
based on the extracted document fields and the document classification, validating a document based on the received document image, the received document classification, and the one or more data validation services to produce a validation result; and
based on the validation result, automatically generating a reimbursement instruction corresponding to the received document classification and the extracted document fields.

16. The system of claim 15, wherein the extracted document fields comprise one or more date fields associated with the reimbursable event and wherein automatically generating a reimbursement instruction corresponding to the received document classification and the extracted document fields further comprises automatically generating a reimbursement instruction based on the one or more date fields.

17. The system of claim 15, wherein the extracted document fields comprise one or more transaction location fields associated with a geographical location and wherein automatically generating a reimbursement instruction corresponding to the received document classification and the extracted document fields further comprises automatically generating a reimbursement instruction based on the one or more transaction location fields.

18. The system of claim 15, wherein the actions further comprise:
loading a loaded document classification machine learning model, wherein the loaded document classification machine learning model is trained based on previously approved documents.

19. The system of claim 18, wherein the actions further comprise:
retraining the loaded document classification machine learning model based on the reimbursement instruction.

20. The system of claim 15, wherein the actions further comprise:
receiving stored location information associated with the one or more document images and correlating the location information with event location information associated with the reimbursable event.

* * * * *